US006709752B1

(12) United States Patent
James et al.

(10) Patent No.: US 6,709,752 B1
(45) Date of Patent: Mar. 23, 2004

(54) COATING COMPOSITIONS AND TEXTILE FABRICS COATED THEREWITH

(75) Inventors: Stephen James, Barry (GB); David Lawson, Cardiff (GB); Melanie Van Der Veen, Cardiff (GB)

(73) Assignee: Dow Corning Limited, Barry (GB)

( * ) Notice: Subject to any disclaimer, the term of this patent is extended or adjusted under 35 U.S.C. 154(b) by 105 days.

(21) Appl. No.: 10/049,462

(22) PCT Filed: Aug. 3, 2000

(86) PCT No.: PCT/EP00/07675

§ 371 (c)(1),
(2), (4) Date: Feb. 13, 2002

(87) PCT Pub. No.: WO01/12894

PCT Pub. Date: Feb. 22, 2001

(30) Foreign Application Priority Data

Aug. 13, 1999 (GB) ................................................ 9919074

(51) Int. Cl.$^7$ ............................ B32B 25/20; B05D 3/02; C08L 83/04; C08L 83/05; C08L 83/07
(52) U.S. Cl. .................... 428/447; 427/387; 524/588
(58) Field of Search ................. 428/447; 427/387; 524/588; 528/15, 31, 32; 525/478, 479

(56) References Cited

U.S. PATENT DOCUMENTS

| 2,823,218 A | | 2/1958 | Speier et al. ............... 260/448 |
| 3,419,593 A | | 12/1968 | Willing et al. ............. 260/448 |
| 5,529,837 A | * | 6/1996 | Fujiki et al. ................. 442/136 |
| 5,539,020 A | * | 7/1996 | Bracken et al. ............. 523/212 |
| 5,908,878 A | * | 6/1999 | Baity et al. ................. 523/203 |
| 6,306,957 B1 | * | 10/2001 | Nakano et al. ............. 524/700 |
| 6,420,037 B1 | * | 7/2002 | Tsuji et al. ................. 428/447 |

FOREIGN PATENT DOCUMENTS

| EP | 150 385 | 12/1984 |
| EP | 0 552 983 A2 | 1/1993 |
| EP | 0 646 672 A1 | 8/1993 |
| EP | 663 468 A1 | 12/1994 |
| EP | 0 553 840 B1 | 3/1996 |
| EP | 0 771 901 A1 | 10/1996 |
| EP | 0 866 164 A1 | 3/1998 |

* cited by examiner

Primary Examiner—Jeffrey B. Robertson
(74) Attorney, Agent, or Firm—Duane Morris LLP

(57) ABSTRACT

An elastomer-forming coating composition for textile fabrics comprises a first, second and third organopolysiloxane having aliphatically unsaturated substituents, an organosilicon crosslinker having at least 3 silicon-bonded hydrogen atoms, a catalyst and a reinforcing filler. First and second organopolysiloxanes have only terminal aliphatically unsaturated substituents, first having a viscosity at 25° C. of from 50 to 650 mm$^2$/s, second a viscosity at 25° C. of at least 10,000 mm$^2$/s and third organopolysiloxane has aliphatically unsaturated substituents at terminal siloxane units and on siloxane units in the siloxane polymer chain. Coated textile fabrics and a process for making them is also claimed. Coated fabrics are especially useful in applications where they form a barrier between areas of differing pressures, e.g. airbags. Resulting coatings combine very good tear strength and elongation at break values.

15 Claims, No Drawings

COATING COMPOSITIONS AND TEXTILE FABRICS COATED THEREWITH

The present invention relates to a coating composition for textile fabrics and to textile fabrics coated with such compositions, and in particular to a fabric coated with a silicone-based coating composition capable of maintaining a pressure barrier between two areas with a pressure differential. The invention also relates to a process of preparing such textile fabrics and to airbags made with coated fabrics.

Coating compositions for textile substrates, which provide a flexible coat on the fabric, e.g. to decrease permeability of the fabric or to improve thermal protection of the fabric are well known in the art, and are described in many patent specifications, such as those referred to below. The present invention is particularly concerned with coating compositions which give a silicone-based elastomeric finish. It is traditionally required to use an adhesion promoter in such compositions to ensure good adhesion to the fabric and to maintain a good shelf life of the coated textile fabric.

EP 553840 describes a liquid silicone rubber coating composition for application to airbags in automobiles, which comprises a polydiorganosiloxane having alkenyl groups, an polyorganosiloxane resin, an inorganic filler, a certain polyorganohydrosiloxane, a platinum group metal catalyst and an epoxy group-containing organosilicon compound. EP 646672 describes a fabric for airbags impregnated with a silicone composition comprising a linear polyorganosiloxane having aliphatic unsaturation, a certain polyorganohydrosiloxane, a catalyst promoting addition reaction, a hydrophobic silica, a flame retardant and optionally an adhesion promoting agent.

While fabrics coated with such compositions may be satisfactory for airbag applications, they do not satisfy requirements where pressurised fluids are to be retained in a fabric envelope for a relatively long period. This requirement exists for example in the application of such coatings to side curtain airbags for the automotive industry. These side curtain airbags are intended to inflate at the time of impact, as do conventional airbags. The side curtains unfold to form a cushioned curtain between passengers and some of the side of the car body, e.g., the windows. As the intention is not merely to cushion the blow on impact itself, as is the case for conventional driver and passenger airbags, but e.g. to protect passengers when a car is rolling, it is important that the side curtain air bag is sufficiently pressurised during such rolling process. Where conventional driver and passenger airbags only need to retain pressure for a fraction of a second, it is desirable that side curtain airbags maintain a suitable pressure for a few seconds. Similar applications exist where a pressurised fabric structure is desired to maintain a certain fluid pressure for a relatively extended period of time, e.g. in emergency chutes for aeroplanes, inflatable rafts etc.

EP 886164 describes a coated fabric comprising a textile fabric coated with at least two layers of an polyorganosiloxane-based elastomeric material, characterised in that the first layer is coated onto the fabric and has an elongation-at-break of at least 400% and in that the second layer has a tear-strength of at least 30 kN/m. However the application of 2 coats onto a fabric substrate causes additional work and cost to the manufacturing process and may provide a final coating of fairly high coat weight. There is a need to provide coatings which will perform well in the side curtain applications, but which require only a single coat and still provide good performance, preferably at lower coat weight.

According to a first aspect of the invention, there is provided a coating composition for textile fabrics, which is curable to an elastomeric finish, which comprises a first, second and third organopolysiloxane having aliphatically unsaturated hydrocarbon or hydrocarbonoxy substituents, an organosilicon crosslinker having at least 3 silicon-bonded hydrogen atoms, a catalyst able to promote the reaction of the aliphacally unsaturated hydrocarbon or hydrocarbonoxy substituents with Si—H groups and a reinforcing filler, wherein the first and second a organopolysiloxanes have aliphatically unsaturated hydrocarbon or hydrocarbonoxy substituents only at the terminal siloxane units, the first organopolysiloxane having a viscosity at 25° C. of from 50 to 650 mm$^2$/s, the second organopolysiloxane having a viscosity at 25° C. of at least 10,000 mm$^2$/s and wherein the third organopolysiloxane has aliphatically unsaturated hydrocarbon or hydrocarbonoxy substituents at terminal siloxane units and on siloxane units in the siloxane polymer chain.

We have found surprisingly that such coating compositions do not need any adhesion promoters to ensure good adhesion to textile fabrics. We have also found that fabrics coated according to the present invention are beneficial in standard airbags and other inflatable safety restraint devices.

The coating composition comprises organopolysiloxanes which are able to cure to an elastomeric finish via an addition reaction. Useful organopolysiloxanes comprise units of the general formula $R_aR'_bSiO_{4-a-b/2}$ (I), wherein R is a monovalent hydrocarbon group having up to 18 carbon atoms, R' is a monovalent hydrocarbon or hydrocarbonoxy group having aliphatic unsaturation, $\underline{a}$ and $\underline{b}$ have a value of from 0 to 3, the sum of $\underline{a+b}$ being no more than 3, provided the conditions outlined above for the organopolysiloxane materials are complied with.

Preferably the first and second organosiloxane polymers are of a generally linear nature having the general structure (II)

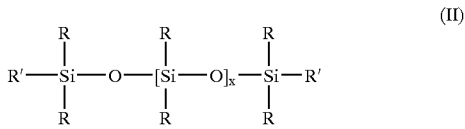

wherein R and R' have the same meaning as above, and wherein x is an integer to allow the organopolysiloxane to fulfill the requirements for the viscosity range, mentioned above, for example a value of up to 300, preferably from 75 to 250, more preferably 100 to 200 for the first organopolysiloxane and having a value of at least 300, preferably from 400 to 1000, more preferably 450 to 1000 for the second organopolysiloxane. It is particularly preferred that R denotes an alkyl or aryl group having from 1 to 8 carbon atoms, e.g. methyl, ethyl, propyl, isobutyl, hexyl, phenyl or octyl. More preferably at least 50% of all R groups are methyl groups, most preferably substantially all R groups are methyl groups. R' is an aliphatically unsaturated hydrocarbon or hydrocarbonoxy group, preferably a hydrocarbon group having from 2 to 22 carbon atoms, more preferably 2 to 8 carbon atoms, most preferably 2 or 6 carbon atoms. It is particularly preferred that the aliphatically unsaturated group is an alkenyl group, although alkynyl groups may also be used. Particularly useful are vinyl, allyl and hexenyl groups, most preferably having terminal unsaturation. It is most preferred that first organopolysiloxane is an α,ω-vinyldimethylsiloxy polydimethylsiloxane polymer having a viscosity of from 50 to 650 mm$^2$/s at 25° C., more preferably 100 to 600 mm²/s, most preferably 300 to 600 mm²/s. It is also most preferred that second organopolysiloxane is an α,ω-vinyldimethylsiloxy polydimethylsiloxane polymer having a viscosity of from 10,000 to 90,000 mm²/s at 25° C., more preferably 20,000 to 80,000 mm²/s, most preferably 40,000 to 70,000 mm²/s.

Preferably the third organosiloxane polymer is also of a generally linear nature having the general structure (III)

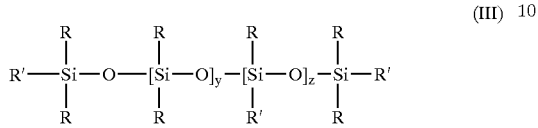

(III)

wherein R and R' have the same meaning as above, and wherein y is zero or an integer and z has a value of at least 1. The value of y+z is no more than 300, preferably from 100 to 200, more preferably from 120 to 180. The value of z is preferably at least 2, more preferably from 2 to 20, most preferably 2 to 5. It is most preferred that third organopolysiloxane is an α,ω-vinyldimethylsiloxy polydimethylsiloxane polymethylvinylsiloxy co-polymer having a viscosity of from 50 to 650 mm²/s at 25° C., more preferably 100 to 600 mm²/s, most preferably 300 to 600 mm²/s.

The relative amounts of first second and third organopolysiloxanes of the first aspect of the invention are not crucial, although it is preferred that the second organopolysiloxane is present in the largest amount. A factor which will influence the exact ratios is the viscosity of each of the organopolysiloxanes and the desired viscosity of the composition needed for coating the textile fabrics. It is preferred that this viscosity is sufficiently low to allow the use of standard coating equipment at normal temperatures. Suitable weight ratios of the first to second organopolysiloxanes are from 1 to 2 to 1 to 20, whilst suitable weight ratios of the second to third organopolysiloxanes are from 20 to 1 to 2 to 1. Particularly suitable weight ratio of first, second and third organopolysiloxanes are 1/2/1, 1/5/1, 2/10/1, 1/10/2, 5/10/1 and 2/5/1. It is preferred that first, second and third organopolysiloxanes combined comprise from 40 to 95% by weight of the elastomer-forming coating composition according to the first aspect of the invention, preferably from 50 to 85%, more preferably 60 to 80%.

Organosilicon cross-linkers for use in the elastomer-forming coating composition according to the invention are preferably selected from silanes, low molecular weight organosilicon resins and short chain organosiloxane polymers. The cross-linker compound has at least 3 silicon-bonded hydrogens which are capable of reacting with the silicon-bonded groups R' of the organopolysiloxane described above by addition reaction between the cross-linking organosilicon compound and the organopolysiloxane, for example according to the general reaction scheme (IV), wherein R" is a divalent hydrocarbon group and y is as defined above, preferably here with a value of 1.

A suitable silane which may serve as cross-linking organosilicon compound is methyltrihydrosilane. Suitable organosilicon resin compounds include organosilicon resins consisting mainly of tetrafunctional siloxane units of the formula $SiO_{4/2}$ and monofunctional units $R_vH_wSi_{1/2}$, wherein R is as defined above, v and w each have a value of from 0 to 3, the sum of v+w being 3. Suitable short chain organosiloxane polymers include those having at least 3 silicon-bonded hydrogen atoms per molecule and may be linear or cyclic. Preferred organosilicon cross-linkers have the general formula

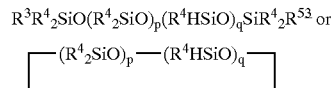

wherein $R^4$ denotes an alkyl or aryl group having up to 10 carbon atoms, $R^3$ is a group $R^4$ or a hydrogen atom, p has a value of from 0 to 20, q has a value of from 1 to 70, and there are at least 3 silicon-bonded hydrogen atoms present per molecule. It is not crucial but preferred that the silicon-bonded hydrogen atoms are on terminal silicon atoms for linear siloxane compounds. It is preferred that $R^4$ denotes a lower alkyl group having no more than 3 carbon atoms, most preferably a methyl group. $R^3$ preferably denotes an $R^4$ group. Preferably p=0 and q has a value of from 2 to 70, more preferably 2 to 30, or where cyclic organosilicon materials are used, from 3 to 8. It is most preferred that the organosilicon crosslinker is a siloxane polymer having a viscosity of from 1 to 150 mm²/s at 25° C., more preferably 2 to 100 mm²/s, most preferably 5 to 60 mm²/s. The cross-linking organosilicon compound may comprise a mixture of several materials as described.

Examples of suitable organosilicon cross-linkers are trimethylsiloxane end-blocked polymethylhydrosiloxane having up to for example 20 carbon atoms, dimethylhydrosiloxane end-blocked methylhydro siloxane, dimethylsiloxane methylhydrosiloxane copolymer and tetramethylcyclotetrasiloxane. The size of the organosilicon crosslinker is not crucial, but preferred are short chain organosiloxane polymers having at least three silicon-bonded hydrogen atoms, which have a chain length of from 2 to 50 silicon atoms, more preferably from 5 to 20. The amount of crosslinker used is preferred to allow a ratio of number of silicon-bonded hydrogen atoms to aliphatically unsaturated hydrocarbon and hydrocarbonoxy groups in the elastomer-forming composition, which is at least 5/1, preferably from 5/1 to 10/1, most preferably 6/1 to 8/1.

In addition to the organopolysiloxanes and the organosilicon cross-linking compounds, the elastomer-forming compositions according the invention preferably also comprise a suitable catalyst, selected from those based on precious metals, particularly Group VIII metals, including ruthenium, rhodium, palladium, osmium, iridium and platinum. Preferably the catalyst is a well-known platinum compound or complex. Suitable platinum compounds and complexes include chloroplatinic acid, platinum acetylacetonate, complexes of platinous halides with unsaturated compounds such as ethylene, propylene, organovinylsiloxanes, and styrene, hexamethyldiplatinum, PtCl2, PtCl3, PtCl4, and Pt(CN)3. The preferred platinum catalyst is a form of chloroplatinic acid, either as the commonly available hexa-hydrate form or in its anhydrous form, as taught in U.S. Pat. No. 2,823,218. Another particularly useful catalyst is the composition that is obtained when chloroplatinic acid is reacted with an aliphatically unsaturated organosilicon compound such as divinyltetramethyldisiloxane, as disclosed in U.S. Pat. No. 3,419,593. It is preferred that the catalyst is employed in an amount giving from 2 to 100 ppm by weight of platinum metal based on the total weight of the total composition, more preferably 5 to 50 ppm.

Another essential ingredient in the elastomer-forming coating composition according to the invention is a reinforcing filler. Suitable fillers include silica, e.g. fumed silica, precipitated silica, gel-formation silica, aerosils, titania and glass microspheres. Preferably the filler has a hydrophobic surface, which may be obtained by treating the filler, e.g. with suitable silanes, short chain siloxanes, fatty acids or resinous silicone materials. Suitable materials and processes for rendering the surface of fillers hydrophobic have been described in the literature, and are known to the person skilled in the art. The amount of reinforcing filler is again not crucial, but preferably from 10 to 50% by weight of the total elastomer forming composition consists of the filler, more preferably from 15 to 40%, most preferably 20 to 30%.

Other additional components may be included in suitable elastomer-forming compositions, including other fillers, chain extenders, dyes, adhesion promoters, colorants, pigments, viscosity modifiers, bath-life extenders, inhibitors and flexibilisers. Suitable other fillers include ground quartz, ground cured silicone rubber particles and calcium carbonate. Preferably these fillers have been treated to make their surface hydrophobic where necessary as described above. Adhesion promoters include epoxy-functional, organotitanates or amino-functional organosilicon compounds. Chain extenders are preferably not used, but where they are used, they tend to be organosiloxane materials which are predominantly linear in nature and which have a silicon-bonded hydrogen at each end of the polymer, allowing it to react with the R' group of siloxane polymers, this merely extending the length of the siloxane polymer.

The coating composition is preferably a composition which comprises (a) 100 parts by weight of a first organopolysiloxane material having only terminal silicon-bonded aliphatically unsaturated hydrocarbon groups per molecule and a viscosity at 25° C. of from 50 to 650 mm$^2$/s;

(b) from 300 to 700 parts by weight of a second organopolysiloxane material having only terminal silicon-bonded aliphatically unsaturated hydrocarbon groups per molecule and a viscosity at 25° C. of at least 10,000 mm$^2$/s;

(c) from 50 to 150 parts by weight of a third organopolysiloxane material having has aliphatically unsaturated hydrocarbon substituents at terminal siloxane units and on units in the polymer chain per molecule;

(d) an organosilicon compound having at least three silicon-bonded hydrogen atoms per molecule, in an amount which is sufficient to give a molar ratio of Si—H groups in (d) to alkenyl groups in (a), (b) and (c) combined of from 5/1 to 10/1;

(e) a group VIII based catalyst component in sufficient amounts to catalyse the addition reaction between (a), (b) and (c) on the one hand and (d) on the other;

(f) from 100 to 400 parts by weight of a hydrophobic filler.

The elastomer-forming coating composition may be prepared by merely mixing the ingredients in the desired ratios. However, for reasons of storage stability and bath life before or during application of the compositions to the textile fabric, it is preferred to store the composition in two parts, by separating the catalyst (d) from the organosilicon cross-linker. The other components of the compositions are often distributed over both parts in proportions which will allow easy mixing of the two parts immediately prior to application. Such easy mixing ratios may be e.g. 1/10 or 1/1 ratios.

The invention includes a process for coating textile fabric with a layer of an elastomer-forming coating composition according to the invention and causing the layer to cure to form an elastomeric coating on the fabric. The invention also includes a coated fabric comprising a textile fabric coated with an elastomer-forming composition as described above cured to an elastomeric layer.

Suitable fabrics for use in the present invention may be made from synthetic fibres or blends of natural and synthetic fibres, and include polyester, polyimides, polyethylene, polypropylene, polyester-cotton, glass fibre, most preferably polyamide fibres such as Nylon 6,6. They are preferably woven fabrics. They are required to be flexible in order to be useful as inflatable bodies. Preferably they are sufficiently flexible to be able to be folded into relatively small volumes, but also sufficiently strong to withstand their deployment at high speed, e.g. under the influence of an explosive charge, the impact of passengers or to be resistant to other influences when inflated.

The elastomer forming coating compositions may be applied according to known techniques to the textile fabric substrates. These include spraying, gravure coating, bar coating, coating by knife-over-roller, coating by knife-over-air, padding and screen-printing. It is preferred that the composition is applied by a knife-over-air or knife-over-roller coating method. It is also preferred that the composition is applied to a coat-weight prior to curing of at least 25 g/m$^2$. Preferably the coating thickness is from 25 to 150 g/m$^2$, more preferably 60 to 130 g/m$^2$ for applications where pressure needs to be maintained longer, e.g. in side curtain airbags, or 30 to 50 g/m$^2$ for applications where the pressure retention is not so critical over prolonged periods, e.g. in standard driver airbags. In order to make the compositions easily applicable to the textile fabric, it is preferred that the viscosity of the composition is from 50,000 to 200,000 mm$^2$/s. The textile fabric is preferably scoured prior to application, in order to ensure good adhesion of the composition.

Although it is not preferred, it is possible to apply the composition in multiple layers, which together fulfill the preferred criteria set out above. It is also possible to apply onto the coating composition a further coating, e.g. of a material providing low friction, or an additional textile fabric, whether woven or non-woven to improve the strength and/or the feel of the fabric.

Curing conditions for the coating are preferably at elevated temperatures over a period which will vary depending on the actual temperature used, for example 120 to 200° C. for a period of up to 5 minutes.

The advantage of the invention is that without having to combine multiple layers of coating on the surface of a textile fabric the fabric is still very able to form a barrier between areas of differing pressure. Particularly useful applications for textile fabrics coated according to the present invention are those applications where the fabric is formed into an envelope and pressure is applied inside the envelope, e.g. by introducing gas into the envelope and thus inflating it. Particularly useful applications include automotive airbags, emergency shoots on aeroplanes, hot air balloons. The most valuable use of fabrics according to the invention is in the production of side curtain airbags for automobiles, where the internal pressure of the envelope needs to be maintained for a relatively long period of time, e.g. from 1 to 5 seconds. A specific advantage of the invention is that the cured coating provides the combination of very high values of elongation at break and tear strength values, making the composition particularly suitable for use with inflatable devices. It was found that the elongation at break is on average at least 400% and tear strength at least 30 kN/m.

The following examples, where parts and percentages are given in weight, unless otherwise stated and where viscosity is dynamic viscosity at 25° C., illustrate the invention.

EXAMPLES

A first composition (I) was prepared by mixing together 52 parts of an α,ω-vinyldimethylsiloxane end-blocked polydimethylsiloxane having a viscosity of about 55,000 mm$^2$/s, 16 parts of an α,ω-vinyldimethylsiloxane end-blocked polydimethylsiloxane having a viscosity of about 450 mm$^2$/s, 7 parts of an vinyldimethylsiloxane end-blocked polydimethyl, polymethylvinyl siloxane copolymer having a viscosity of about 350 mm$^2$/s, 25 parts of a fumed silica which had its surface made hydrophobic and 0.002 parts by weight of a platinum based catalyst. Composition (I) had a viscosity of 130,000 m$^2$/s.

A second composition (II) was prepared, containing 51 parts by weight of an α,ω-vinyldimethylsiloxane end-blocked polydimethylsiloxane having a viscosity of 55,000 mm$^2$/s, 3 parts of an α,ω-vinyldimethylsiloxane end-blocked polydimethylsiloxane having a viscosity of about 450 mm$^2$/s, 9 parts of an vinyldimethylsiloxane end-blocked polydimethyl, polymethylvinyl siloxane copolymer having a viscosity of about 350 mm$^2$/s, 25 parts by weight of a fumed silica which had its surface made hydrophobic, 12 parts by weight of an methylhydrosiloxane dimethylsiloxane copolymer having trimethylsiloxane end-blocking units, at least 3 silicon-bonded hydrogen atoms per molecule and a viscosity of about 5 mm$^2$/s. Composition (II) had a viscosity of 130,000 mm$^2$/s.

A first comparative elastomer-forming composition (C1) was prepared by mixing together 70 parts of an α,ω-vinyldimethylsiloxane end-blocked polydimethylsiloxane having a viscosity of about 2,000 mm$^2$/s, 30 parts of a fumed silica which had its surface made hydrophobic and 0.002 parts by weight of a platinum based catalyst. Composition (C1) had a viscosity of 100,000 mm$^2$/s.

A second comparative composition (C2) was prepared, containing 64 parts by weight of an α,ω-vinyldimethylsiloxane end-blocked polydimethylsiloxane having a viscosity of 2, 000 mm$^2$/s, 26 parts by weight of a fumed silica which had its surface made hydrophobic, 4 parts by weight of an methylhydrosiloxane dimethylsiloxane copolymer having trimethylsiloxane end-blocking units, at least 3 silicon-bonded hydrogen atoms per molecule and a viscosity of about 5 mm$^2$/s and 5 parts by weight of a dimethylsiloxane having dimethylhydrosiloxane andblocking units and a viscosity of about 10 mm$^2$/s. Composition (C2) had a viscosity of 100,000 mm$^2$/s.

A third comparative composition (C3) was prepared containing 64 parts of an α,ω-vinyldimethylsiloxane end-blocked polydimethylsiloxane having a viscosity of about 55,000 mm$^2$/s, 25 parts of a fumed silica which had its surface made hydrophobic, 0.002 parts by weight of a platinum based catalyst, and 9 parts of a dimethylsiloxane methylvinylsiloxane copolymer having vinyldimethylsiloxane end-blocking units and a viscosity of about 350 mm$^2$/s. Composition (C3) had a viscosity of 175,000 mm$^2$/s.

A fourth comparative composition (C4) was prepared by mixing together 61 parts of an α,ω-vinyldimethylsiloxane end-blocked polydimethylsiloxane having a viscosity of about 55,000 mm$^2$/s, 25 parts of a fumed silica which had its surface made hydrophobic, 3 parts by weight of an methylhydrogensiloxane dimethylsiloxane copolymer having trimethylsiloxane end-blocking units, at least 3 silicon-bonded hydrogen atoms per molecule and a viscosity of about 5 mm$^2$/s and 9 parts of a dimethylsiloxane methylvinylsiloxane copolymer having vinyldimethylsiloxane end-blocking units and a viscosity of about 350 mm$^2$/s. Composition (C4) had a viscosity of 175,000 mm$^2$/s.

A fifth comparative composition (C5) was prepared by mixing 5 parts of a first composition comprising 64 parts of a 70/30 mixture of a dimethylvinylsiloxy-terminated polydimethylsiloxane and hydrophobic silica, 26 parts of ground quartz, 4 parts of calcium carbonate and a catalytic amount of a platinum based catalyst and 1 part of a second composition comprising 50 parts of a 70/30 mixture of a dimethylvinylsiloxy-terminated polydimethylsiloxane and hydrophobic silica, 46 parts of a dimethylsiloxane methylhydrogen siloxane copolymer having silicon-bonded hydrogen atoms on about 50% of the silicon atoms.

Example 1

A double layered polyamide fabric of 470 Dtex was made into A4 sized envelopes coated on both sides of the fabric by a knife over roller technique with a 50/50 elastomer-forming mixture of compositions (I) and (II) to a coat weight of 120 g/m$^2$, followed by heating the coated fabric for 90 seconds at 150–170° C. After allowing the coated fabric to cool to room temperature, a coated fabric was obtained having a silicone-based coat.

The fabric was then inflated with air under explosive conditions to a pressure of 220 kPa. The pressure in the sealed envelope was then measured after 5 seconds and after 10 seconds. Details of the test results are given below in Table I. Also were measured tear strength and elongation at break of a self-supported film of the cured coating composition. Results are also given in Table 1.

Comparative Examples C1–C5

All examples were carried out according to the process of Example 1. Comparative Example CE1 used a 50/50 mixture of Comparative compositions C1 and C2; Test results are also given in Table I below.

TABLE I

| Example | Residual pressure after 5 seconds | Residual pressure after 10 seconds | Tear Strength kN/m | Elongation at break |
|---|---|---|---|---|
| 1 | 180 kPa | 150 kPa | 40 | 600% |
| CE1 | 140 kPa | 70 kPa | 15 | 600% |
| CE2 | 130 kPa | 70 kPa | 45 | 250% |
| CE3 | 110 kPa | 50 kPa | 10 | 150% |

What is claimed is:

1. A coating composition for textile fabrics, which is curable to an elastomeric finish, which composition comprises (a) a first organopolysiloxane material having only terminal silicon-bonded aliphatically unsaturated hydrocarbon groups per molecule and a viscosity at 25° C. of from 50 to 650 mm$^2$/s; (b) a second organopolysiloxane material having only terminal silicon-bonded aliphatically unsaturated hydrocarbon groups per molecule and a viscosity at 25° C. of at least 10,000 mm$^2$/s; (c) a third organopolysiloxane material having aliphatically unsaturated hydrocarbon substituents at terminal siloxane units and on units in the polymer chain per molecule; (d) an organosilicon crosslinker having at least 3 silicon-bonded hydrogen atoms, (e) a catalyst able to promote the reaction of the aliphatically unsaturated hydrocarbon or hydrocarbonoxy substituents with Si—H groups and (f) a reinforcing filler.

2. A coating composition according to claim 1, wherein the first and second organosiloxane polymers are of a generally linear nature having the general structure (II)

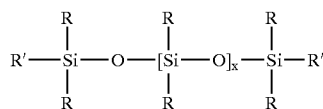

wherein R is a monovalent hydrocarbon group having up to 18 carbon atoms and R' is a monovalent hydrocarbon or hydrocarbonoxy group having aliphatic unsaturation and wherein x is an integer with a value of up to 200 for the first organopolysiloxane (a) and having a value of at least 300 for the second organopolysiloxane (b).

3. A coating composition according to claim 2, wherein the first organopolysiloxane is an α,ω-vinyldimethylsiloxy polydimethylsiloxane polymer having a viscosity of from 50 to 650 mm²/s at 25° C., and wherein the second organopolysiloxane is an α, ω vinyldimethylsiloxy polydimethylsiloxane polymer having a viscosity of from 10,000 to 90,000 mm²/s at 25° C.

4. A coating composition according to claim 1, wherein the third organosiloxane polymer is of a generally linear nature having the general structure (III)

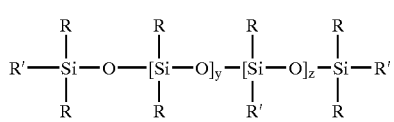

wherein R is a monovalent hydrocarbon group having up to 18 carbon atoms and R' is a monovalent hydrocarbon or hydrocarbonoxy group having aliphatic unsaturation, and wherein y is zero or an integer and z has a value of at least 1, while the value of y+z is no more than 300.

5. A coating composition according to claim 1, wherein the first and second organopolysiloxane are present in a weight ratio of (a) to (b) of from 1 to 2 to 1 to 20 and the second and third organopolysiloxanes are present in a weight ratio of (b) to (c) of from 20 to 1 to 2to 1.

6. A coating composition according to claim 1, wherein the organosilicon cross-linker has the general formula

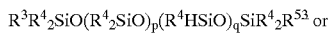
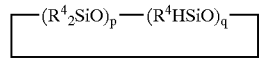

wherein R⁴ denotes an alkyl or aryl group having up to 10 carbon atoms, R³ is a group R⁴ or a hydrogen atom, p has a value of from 0 to 20, q has a value of from 1 to 70, and there are at least 3 silicon-bonded hydrogen atoms present per molecule.

7. A coating composition according to claim 1, wherein the catalyst is based on a Group VIII metal selected from ruthenium, rhodium, palladium, osmium, iridium and platinum.

8. A coating composition according to claim 7, wherein the catalyst is selected from chloroplatinic acid, platinum acetylacetonate and complexes of platinous halides with unsaturated compounds.

9. A coating composition according to claim 1, wherein the reinforcing filler is selected from silica, titania and glass microspheres.

10. A coating composition comprising (a) 100 parts by weight of a first organopolysiloxane material having only terminal silicon-bonded aliphatically unsaturated hydrocarbon groups per molecule and a viscosity at 25° C. of from 50 to 650 mm²/s; (b) from 300 to 700 parts by weight of a second organopolysiloxane material having only terminal silicon-bonded aliphatically unsaturated hydrocarbon groups per molecule and a viscosity at 25° C. of at least 10,000 mm²/s; (c) from 50 to 150 parts by weight of a third organopolysiloxane material having aliphatically unsaturated hydrocarbon substituents at terminal siloxane units and on units in the polymer chain per molecule; (d) an organosilicon compound having at least three silicon-bonded hydrogen atoms per molecule, in an amount which is sufficient to give a molar ratio of Si—H groups in (d) to alkenyl groups in (a), (b) and (c) combined of from 5/1 to 10/1; (e) a group VIII based catalyst component in sufficient amounts to catalyse the addition reaction between (a), (b) and (c) on the one hand and (d) on the other, (e) from 100 to 400 parts by weight of a hydrophobic reinforcing filler.

11. A coated fabric comprising a textile fabric coated with an elastomer-forming composition according to claim 1 cured to an elastomeric layer.

12. A coated fabric according to claim 11 wherein the elastomeric layer has an elongation of above 400% and a tear strength of over 30 kN/m.

13. A process for making a coated fabric, which comprises coating a textile fabric with a layer of an elastomer-forming coating composition according to claim 1 and causing the layer to cure to form an elastomeric coating on the fabric.

14. A process according to claim 13, wherein the composition is applied to a coat-weight prior to curing of at least 25 g/m².

15. A process according to claim 13, wherein the composition is cured at a temperature of from 120 to 200° C. for a period of up to 5 minutes.

* * * * *